March 5, 1957  S. STOKLAND  2,783,921
SEED PLANTERS

Filed March 2, 1955  3 Sheets-Sheet 1

INVENTOR:
Sigmund Stokland
BY A. John Michel
ATTORNEY.

March 5, 1957

S. STOKLAND 2,783,921

SEED PLANTERS

Filed March 2, 1955

INVENTOR:
Sigmund Stokland
BY A. John Michel
ATTORNEY

United States Patent Office 2,783,921
Patented Mar. 5, 1957

2,783,921

SEED PLANTERS

Sigmund Stokland, Oslo, Norway

Application March 2, 1955, Serial No. 491,665

Claims priority, application Norway March 9, 1954

14 Claims. (Cl. 222—252)

This invention relates to seed planters of the kind in which the seed is fed, by means of a feeding device, from a container to a distributing device from which it is discharged uniformly into a number of circularly positioned ports or channels each leading to a separate drill or planting plough.

It is an object of the invention to provide a simple and compact construction of a planter of the kind referred to, by means of which all types of seed or corn may be planted with similar uniformity and exactness in a predetermined quantity which may be regulated at will.

For a better understanding of the invention, and to show how the same may be carried into effect, reference will now be made to the accompanying drawings in which.

Figure 1:
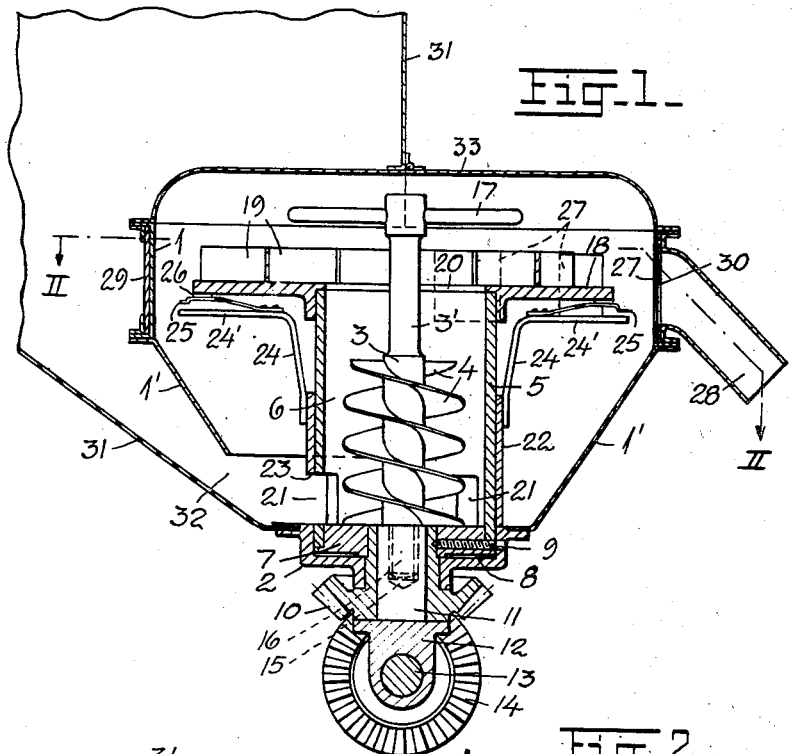
Figure 1 is a vertical, axial cross section through a seed planter.

Referring now to the drawings there is shown a cylindrical seed container 1 having a conical or funnel-shaped lower portion 1' closed by means of a support member 2. A vertical unrotatable, screw conveyor member 3 having a single or multiple thread 4, is arranged centrally within the container 1.

The screw conveyor 3 is situated axially within a sleeve or tube 5 having an interior diameter which is somewhat greater than the outer diameter of the thread 4 so that a convenient intermediate space 6 is formed therebetween. The tube 5, the upper end of which is open, has its lower end closed by means of a lower end closure or end piece 7 rotatably received in a corresponding depression 8 in the support member 2 so that the upper side of the end piece 7 is level with the upper side of said support member 2.

The end piece 7 is secured, by means of set screws 9 or the like, on the end of a bevel gear 10 rotatably supported in the support member 2. The bevel gear 10 is provided with an axial bore which rotatably receives a short stationary shaft 11 extending radially from a sleeve 12 rotatably supported on a driving shaft 13 arranged below said gear 10. The driving shaft 13 is rotatably supported in the frame 36 of the planter and driven by means of a chain transmission 35 from one of the transporting wheels 36' thereof. On the said driving shaft 13 is secured a bevel gear 14 meshing with the gear 10 and serving to rotate the same and thereby the tube 5 in a direction corresponding to the direction of pitch of the screw thread 4.

The short shaft 11, the upper end surface of which is level with the upper side of the support member 2, is provided with an axial, threaded bore 15 into which a corresponding, threaded end portion 16 of the screw conveyor 3 is secured. The core shaft of the screw conveyor 3 is provided with an upwardly projecting extension 3' having at its upper end a cross pin 17 serving as a handle.

On the upper end of the tube 5, which extends somewhat above the threaded portion of the screw conveyor 3, is secured a spreading disc 18 having a horizontal even upper face which is provided with upstanding spreading vanes 19. The disc 18 is provided with a central bore co-axial with the open end of the tube 5 as shown.

Figure 2:
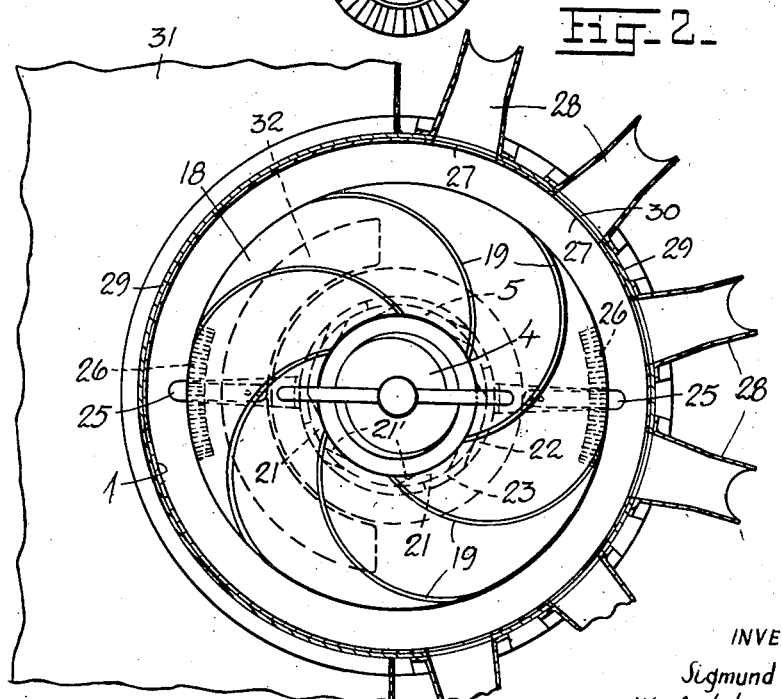
Figure 2 is a plan view in section on the line II—II of Figure 1.
Figure 3:
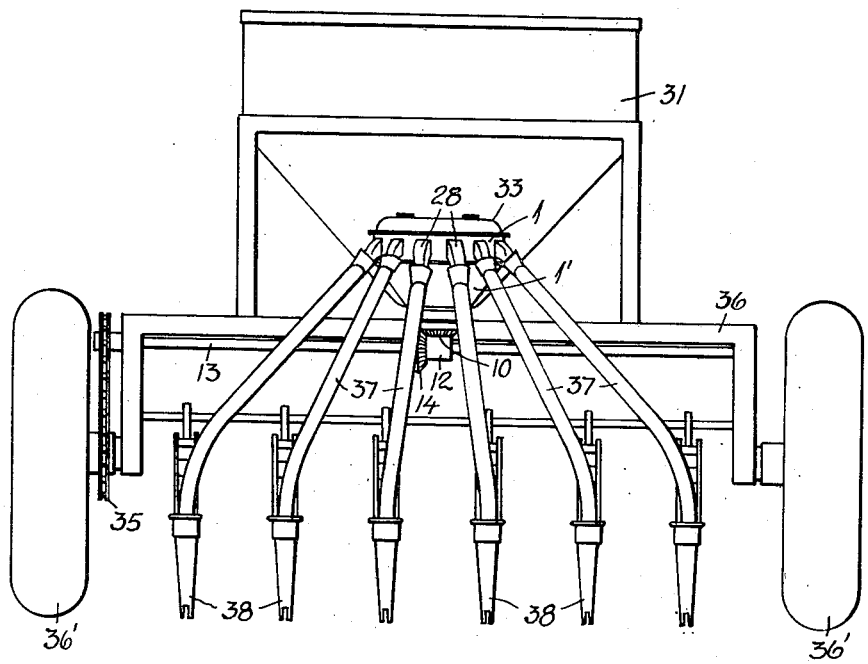
Figure 3 is a rear end view of the planter.

At its lower end the tube 5 is provided with one or more circumferential openings 21 communicating with the seed container 1. The said openings 21, the lower bounding edges of which are level with the upper surface of the end piece 7, are rectangular in shape and the bounding side edges 21' thereof are wedge shaped as shown in Figure 2.

A regulating sleeve 22 is rotatably mounted on the tube 5. The sleeve 22 is provided with circumferential openings 23 corresponding to the openings 21 in the tube 5 so that said openings 21 and 23 coincide in a certain position of the sleeve 22 relatively to the tube 5. In rotating the sleeve 22 about the tube 5 the width of the openings 21 may be reduced as the circumferential portions of the sleeve, intermediate the openings 23 therein, are displaced to cover the openings 21 to an extent dependent on the angular displacement of said sleeve. In order to retain the sleeve 22 in a set position the sleeve is provided, at diametrically opposite sides, with upwardly projecting arms 24 having at their upper ends radially extending portions 24' on the upper sides of which are secured spring locking means 25 adapted to engage with toothed arcs 26 located on the lower side of the spreading disc 18.

In the cylindrical portion of the seed container 1, on a level with the spreading disc 18, ports or channels 27 are arranged, each of said ports communicating with an outer tube 28 connected to a supply tube 37 leading to a planting plough 38 or the like.

The ports 27, of which there are six shown in the drawings, are evenly spaced around one half of the circumference of the container 1.

Between the wall of the container 1 and the inlets to the tube 28 a sliding baffle 29 is displaceably mounted. The baffle 29 has openings 30 which normally coincide with the ports 27 and the area of the latter may be regulated by displacement of said baffle in a manner known per se.

In order to be able to carry a larger quantity of seed than that which can be carried solely in the container 1 the latter may, by means of a side opening 32, communicate with a storage container 31 surrounding the half of the seed container 1 opposite to the half at which the tubes 28 are arranged.

The top of the container 1 is closed by means of a cover 33 which may be divided in a plane coinciding with the rear wall of the storage container 31 so that the rear half of said cover 33 may be swung upwardly or removed when the sleeve 22 is to be adjusted or the like.

The device operates in the following manner:

The storage container 31 is filled with the seed or corn to be planted. The seed flows through the opening 32 into the lower part of the container 1 and fills the same to a level located above the upper edge of the openings 21 in the tube 5.

When the planter is driving along the ground the shaft 13 is rotated and drives (by means of the bevel gears 14 and 10), the tube 5 in the same direction as the pitch of the screw conveyor 3. During this rotation of the tube 5 the seed is forced through the openings 21 into the tube 5. Due to the pressure and the friction between the seed and the inner surface of the tube and as the seed is at the same time supported by the threads of the stationary screw conveyor, the seed is screwed upwardly within the tube 5 and flows evenly out from the upper open end thereof. In order to avoid the formation of wave-motion in the top of the seed column the thread 4 of the screw conveyor 3 ends at a location below the upper end of the tube, as shown in Figure 1.

The seed, which in this manner is moved on to the upper side of the disc 18, is centrifugally expelled from the disc 18, guided by the vanes 19 and is thrown into the respective ports 27. Seeds which are not passed out through said ports 27 fall down to the bottom of the container 1 and are repeatedly fed into the tube 5 through the opening 21 therein.

In order to regulate the amount of seed which at any time flows upwardly to the upper face of the disc 18 the free area of the openings 21 can be adjusted by rotation of the sleeve 22, and in order to regulate the number of seeds thrown out through the ports 27 in the container, the free area of said ports may be adjusted by moving the baffle 29.

In the above described manner seeds of any size and type may be fed in the desired quantity to the distributing member and be evenly distributed thereby so that the seeds may be passed out singly, or in a desired number, through the separate ports 27 to the planting ploughs connected therewith.

The screw conveyor 3, shown and described, may be used for seed of any type, but for planting seed having a small size it may be convenient, in order to avoid having too great a residue of seed within the tube when the planting has been finished, to replace said screw conveyor with another one having a greater core diameter and possibly also greater thread diameter in order to reduce the intermediate space 6.

In order to prevent supply of seed to any of the ports 27 the container 1 may be provided on its inner side with guides for detachable closing plates by means of which the ports may be individually covered.

Figure 4:
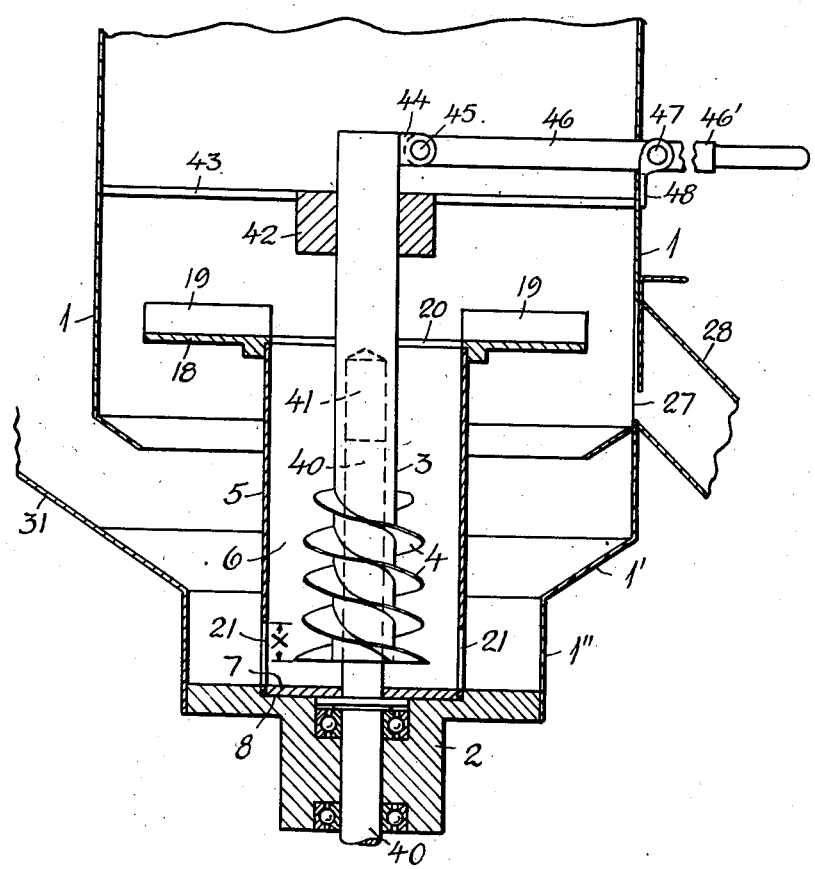
Figure 4 is a section similar to Figure 1 showing a modified embodiment.

As the movement of the seed upwardly within the tube 5 takes place, as above stated, due to the combined effect of the rotation of the tube and the supporting by the stationary thread, the quantity of seed which at any time flows upwardly to the upper face of the distributing disc may also be regulated thereby that the screw conveyor member 3 is mounted adjustable in vertical direction so that the distance between the upper edge of the openings 21 of the tube 5 and the lower end of the thread 4 may be varied. An embodiment allowing such adjustment is shown in Figure 4.

In said figure the support member 2 is connected to the funnel-shaped portion 1' of the seed container 1 by means of a cylindrical portion 1'' having a hight somewhat greater than that of the openings 21 of the tube 5. The end closure 7 of the tube 5 in this case is secured on a shaft 40 rotatably supported in the support member 2 and extending a certain distance upwardly within the tube as shown. The lower end of said shaft 40 being provided with the bevel gear 10 (not shown). The screw conveyor 3 is provided with an axial bore 41 receiving rotatably the shaft 40. At its upper end the screw conveyor 3 is displaceably but unrotatably supported in a bearing 42 secured to the wall of the seed container 1 by means of a spider 43. Further the screw conveyor is provided with a lug 44 to which by means of a pivot 45 is secured one arm 46 of a two-armed lever, the other arm of which projects outside of the container 1, the said lever being pivotally secured to the container by means of the pivot 47 supported by a bracket 48.

In this construction the screw conveyor 3 may be adjusted in its axial direction by rotating the lever so that the distance x between the upper edge of the openings 21 of the tube and the lower end of the threads 3 may be varied in accordance with the desired discharge.

I claim:

1. In a seed planter of the kind referred to, a feeding device comprising an unrotatable screw conveyor member mounted vertically in a seed container, a rotatably supported tube surrounding said member and radially spaced therefrom, the screw conveyor member being axially adjustable relative to said tube, said tube having an open upper end and a lower end closure level with the bottom of said container, at least one circumferential opening at the lower end of said tube through which it communicates with the interior of said container, distributing means secured onto the upper end of said tube and means for rotating said tube about its longitudinal axis.

2. In a seed planter as in claim 1, in which a sleeve-shaped baffle is adjustably mounted on said tube for adjusting the area of the communication between the bore of the tube and the interior of the seed container.

3. In a seed planter of the kind referred to a feeding device comprising an unrotatable screw conveyor member mounted vertically in a seed container, a rotatably supported tube surrounding said member and radially spaced therefrom, the screw conveyor member being axially adjustable relative to said tube, said tube having an open upper end and a lower end closure level with the bottom of said container, a number of circumferential openings at the lower end of said tube, distributing means secured onto the upper end of said tube, circularly positioned spaced ports in the wall of said seed container situated at a location approximately level with said distributing means, each of said ports leading to a tube piece secured to the outside of the container and adapted to be connected to a supply tube of a planting plough or drill and means for rotating said tube about its longitudinal axis.

4. In a seed planter as in claim 3 in which said spaced ports are arranged on half of the circumference of said seed container, a side opening in said seed container communicating with a storage container surrounding the half of said seed container opposite to the half thereof at which the ports are situated.

5. In a seed planter as in claim 3, in which the end closure of said tube is secured on a vertical shaft rotatably supported in the bottom of said seed container, said shaft, below said bottom being provided with a bevel gear meshing with a corresponding bevel gear secured on a driving shaft.

6. In a seed planter as in claim 3, in which a sleeve-shaped baffle is adjustably mounted on said tube for adjusting the area of the openings therein, means being provided for retaining said baffle in a chosen position.

7. In a seed planter, a feeding device comprising a seed container, a non-rotatable screw conveyor member mounted vertically in the seed container, a rotatably supported tube surrounding said member and having an inner diameter greater than the outer diameter of the screw conveyor member to define an axial annular passage therebetween, said tube having an open upper end and a lower end closure level with the bottom of the container, the lower end of said tube having at least one circumferential opening through which it communicates with the interior of the container, adjustable means for regulating the effective area of said opening, distributing means secured to the upper end of the tube, the container having circularly positioned spaced ports level with the distributing means, and means for rotating the tube about its longitudinal axis.

8. In a seed planter as in claim 7, in which said unrotatable screw conveyor member is axially adjustable relatively said tube.

9. In a seed planter as in claim 7, in which said rotatable tube is provided with a number of circumferential openings communicating with the interior of said container.

10. In a seed planter as in claim 7, in which said distributing means consists of a disc which is secured onto the upper end of said tube and is provided with a central bore co-axial with the bore of the tube, and spreading vanes at the upper face thereof.

11. In a seed planter as in claim 7 in which said unrotatable screw conveyor member is axially adjustable relatively said tube.

12. In a seed planter as in claim 7 in which means is provided for adjusting the area of said ports.

13. In a seed planter as in claim 7 in which said spaced ports are arranged on half of the circumference of said seed container.

14. A seed planter as defined in claim 7, comprising a tube piece secured to the outside of the container and in communication with said ports, the tube piece being adapted to be connected to a supply tube of a planting plough.

References Cited in the file of this patent

UNITED STATES PATENTS

| | | |
|---|---|---|
| 756,327 | Carkeek | Apr. 5, 1904 |
| 882,926 | Boynton | Mar. 24, 1908 |
| 2,115,464 | Kirby | Apr. 26, 1938 |
| 2,189,018 | Robinson | Feb. 6, 1940 |

FOREIGN PATENTS

| | | |
|---|---|---|
| 568,864 | Germany | July 20, 1933 |
| 673,985 | Great Britain | June 18, 1952 |
| 1,034,018 | France | Feb. 6, 1940 |